United States Patent [19]
Holleyman

[11] Patent Number: 5,755,096
[45] Date of Patent: May 26, 1998

[54] FILTERED FUEL GAS FOR PRESSURIZED FLUID ENGINE SYSTEMS

[76] Inventor: John E. Holleyman, 3402 Polk St., Monroe, La. 71201

[21] Appl. No.: 679,773

[22] Filed: Jul. 15, 1996

[51] Int. Cl.⁶ .............................. F16D 31/02; B01D 45/00
[52] U.S. Cl. .................. 60/407; 60/453; 60/456; 55/407
[58] Field of Search ................ 55/406, 407; 60/407, 60/371, 453, 456

[56] References Cited

U.S. PATENT DOCUMENTS

| | | | |
|---|---|---|---|
| 3,234,716 | 2/1966 | Sevin et al. | 55/407 X |
| 4,162,614 | 7/1979 | Holleyman | 60/407 X |
| 4,292,804 | 10/1981 | Rogers, Sr. | 60/407 |
| 4,994,097 | 2/1991 | Brouwers | 55/407 X |
| 5,073,177 | 12/1991 | Brouwers | 55/407 X |

*Primary Examiner*—Hoang Nguyen
*Attorney, Agent, or Firm*—Laurence R. Brown

[57] ABSTRACT

This invention provides for reliable, long-life operation of fluid pressure responsive engines directly from raw natural gas at the wellhead by introducing a novel rotary dynamic contaminant filter system especially adapted for removing liquid and abrasive particle contaminants from the flow of natural gas under high pressure from the wellhead. Thus, a novel turbine type gas driven rotor in the gas flow stream has rotor blades slanted at an angle to the rotation axis to serve as a ramp for removal of contaminants as the flow of gas spirals upwardly from input to output ports. This dynamic filter employs the combined forces of gravity, centrifugal force and those imposed by interception with a contaminant flow ramp to encounter and remove a wide range of microscopic contaminants from the high pressure wellhead natural gas.

6 Claims, 3 Drawing Sheets

FILTERED FUEL GAS FOR PRESSURIZED FLUID ENGINE SYSTEMS

TECHNICAL FIELD

This invention relates to the operation of engines fueled by fluid under pressure, and more particularly it relates to the reliable operation of such engines from pressurized raw natural gas coming from underground wells.

BACKGROUND ART

Fluid pressure operated engines are known in the art from my previous U. S. Patents, namely U.S. Pat. No. 4,162,614 for Pressure Fluid Operated Power Plant, Jul. 31, 1979; U.S. Pat. No. 4,507,918 for Reciprocating Piston Compressed Fluid Engine having Radial Cylinders and Triggerable Valves, Apr. 2, 1985; U.S. Pat. No. 4,896,505 for Pressurized-Fluid-Operated Engine, Jan. 30, 1990; and U.S. Pat. No. 5,163,292 for Simplified Fluid Pressure Operated Engine, Nov. 17, 1992.

It is desirable to operate these engines as stationary power plants in the vicinity of natural gas wells that deliver the gas at high pressure, thus providing a continuous low cost fuel supply. However, reliability of operation and long engine life has not resulted in such operations. Analysis of engine failures shows that erosion and abrasion of engine parts are the primary cause for accelerated engine failures when operating directly from raw gas at the wellheads. Such failures thus have been imparted to impurities in the natural gas, such as acids, chemicals, oils, water and abrasive particles. Thus, with the close mechanical tolerances in fluid pressure fueled engines, high pressure flow paths, and high operating temperatures from friction during operation, engine life is considerably shortened when using raw gas at the wellhead, as compared with operation from external sources of impurity free gas.

It has however not been feasible heretofore to use natural gas as a fuel source. Because of high pressures desired for engine operation and the diversity of the impurities to be removed from the natural gas, conventional filters could not be used and the discovery of suitable filtering of the raw gas supply to correct this problem has been elusive.

Any conventional filtering process operable to extract substantially all liquid impurities and tiny abrasive solids so small that they are not detected by the human eye from a high pressure gas flow stream would result in significant reduction of the pressure and flow energy in the gas stream that fuels the fluid pressure engine. Furthermore, any pre-processing of the raw natural gas to remove the type of impurities that reduce fluid pressure engine life would significantly increase the cost of the fuel and thus overcome the advantages of using raw natural gas as fuel.

Thus, it is an objective of the invention to provide an uncontaminated natural gas fuel source by processing raw natural gas leaving a well head at high pressure without significant reduction in the pressure or flow rate.

A further objective of this invention is to provide a long life fluid pressure operated engine system fueled by filtered raw natural gas obtained directly at the well heads.

It is a further object of the invention to provide a filtering process for decontaminating natural gas fuel obtained directly from well head sources in a manner that does not significantly reduce the gas pressure or the flow rate.

Other objects, features and advantages of the invention will be found throughout the following description, claims and accompanying drawings.

BRIEF SUMMARY OF THE INVENTION

This invention provides an improved long-life fluid pressure engine system operable from a raw natural gas fuel source with an intermediate novel dynamic fuel filter that strips raw natural gas of contaminants such as acids, oils, minerals, water and abrasive particles when flowing directly from a well head at the high pressure and flow velocities suitable as a fuel source for fluid pressure fueled engines. The filtering furthermore should not significantly impede the fuel energy content of the gas flow stream, so that the basic raw gas fuel content is preserved for driving the engine.

In order to operate a fluid pressure engine from the raw natural gas well head on line without excessive engine wear and deterioration, the contaminant separator requires special construction and operating conditions. The contaminants flowing in the raw gas at the wellhead include liquids such as salt water, corrosive chemicals and abrasive particles that contribute to early engine failure. Furthermore the separator must not significantly reduce the gas pressure or flow rate, which serves as the essential fuel for the fluid pressure engine. This means that contaminant separation of these various contaminants must occur at very high pressures and flow rates continuously on line without clogging the filter or bypassing contaminants into the engine.

In accordance with this invention, raw natural gas fuel flowing at high pressure from the well head drives a dynamic rotary filter incorporating novel improvements for effectively removing both fluid and abrasive particle contaminants from the raw wellhead gas flow stream that passes therefrom into the engine as operating fuel. The rotary filter is thus inserted in a natural gas flow line to be rotated at high speeds by the pressure and flow of the gas with little energy taken therefor from the gas flow stream, and is constructed essentially as a rotating centrifugal separator that isolates microscopic contaminants from the gas flow stream.

However, the separation of the wide range of kinds of engine threatening contaminants found in the raw gas stream at the wellhead is a challenge. Predominantly the gas is contaminated with liquid contaminants including oil, salt water and water vapor. Liquids are in turn contaminated with salt, sulphur and other corrosive chemicals and may constitute acids. Furthermore microscopic abrasive particles, such as sand, are carried in the gas flow stream, which would seriously affect engine wear and also must be removed. Thus, it has been a significant challenge to provide a continuously operable fluid engine system using raw natural gas at the wellhead as a fuel source.

A centrifuge type dynamic rotary filter could be powered directly for rotation from the wellhead gas pressure and flow, but that did not remove enough contaminants from the raw wellhead gas flow stream to protect the engine from premature wear and deterioration. Thus the present invention is directed to an improved dynamic rotary filter that has been experimentally tested and found to effectively remove the aforesaid range of contaminants so that fluid engines can be operated with raw wellhead natural gas with long life.

The preferred centrifuge embodiment of this invention essentially operates as a rotary gas driven turbine utilizing the combined forces of gravity, centrifugal action and directed ramp discharge paths for separating and discharging the contaminants from the natural gas flow stream.

BRIEF DESCRIPTION OF THE DRAWINGS

In the accompanying drawings, wherein like reference characters throughout the various views indicate similar features to facilitate comparison.

THE PREFERRED EMBODIMENT

Figure 1:
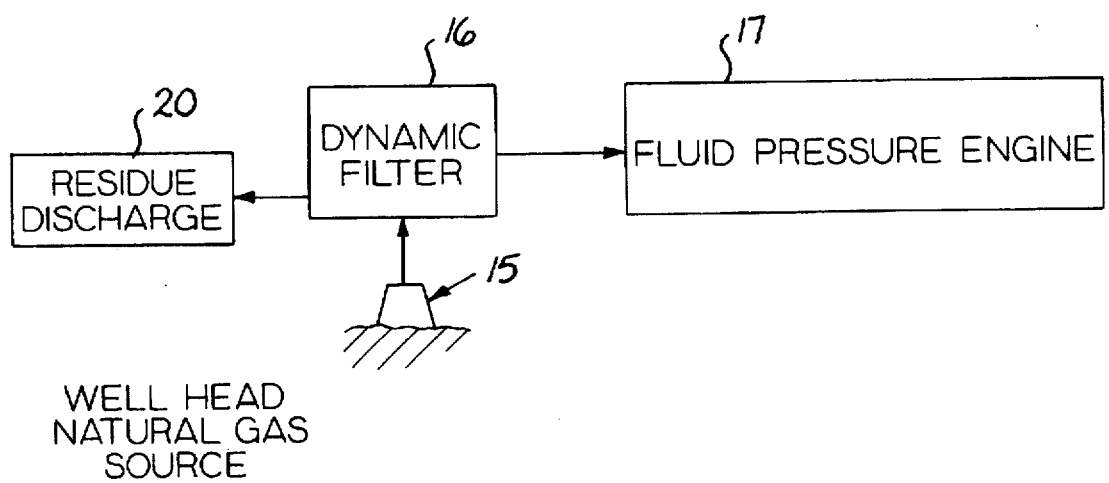
FIG. 1 is a block system diagram of the improved long life fluid pressure system afforded by this invention.

As seen in FIG. 1, high pressure raw natural gas at the well head 15, typically at 250 psi, is passed through a dynamic filter 16 for removing contaminants, so that the fluid pressure engine 17 can be continuously operated without significant deterioration over a long life span.

Since the primary contaminants are in liquid form such as oil residues, water vapors, salt water, acids, etc., these liquids when separated are gathered in a reservoir at the separation site. Thus, a residue discharge system 20, such as a float operated evacuation valve, serves to discharge from the reservoir fluids containing other residue contaminants.

Figure 2:
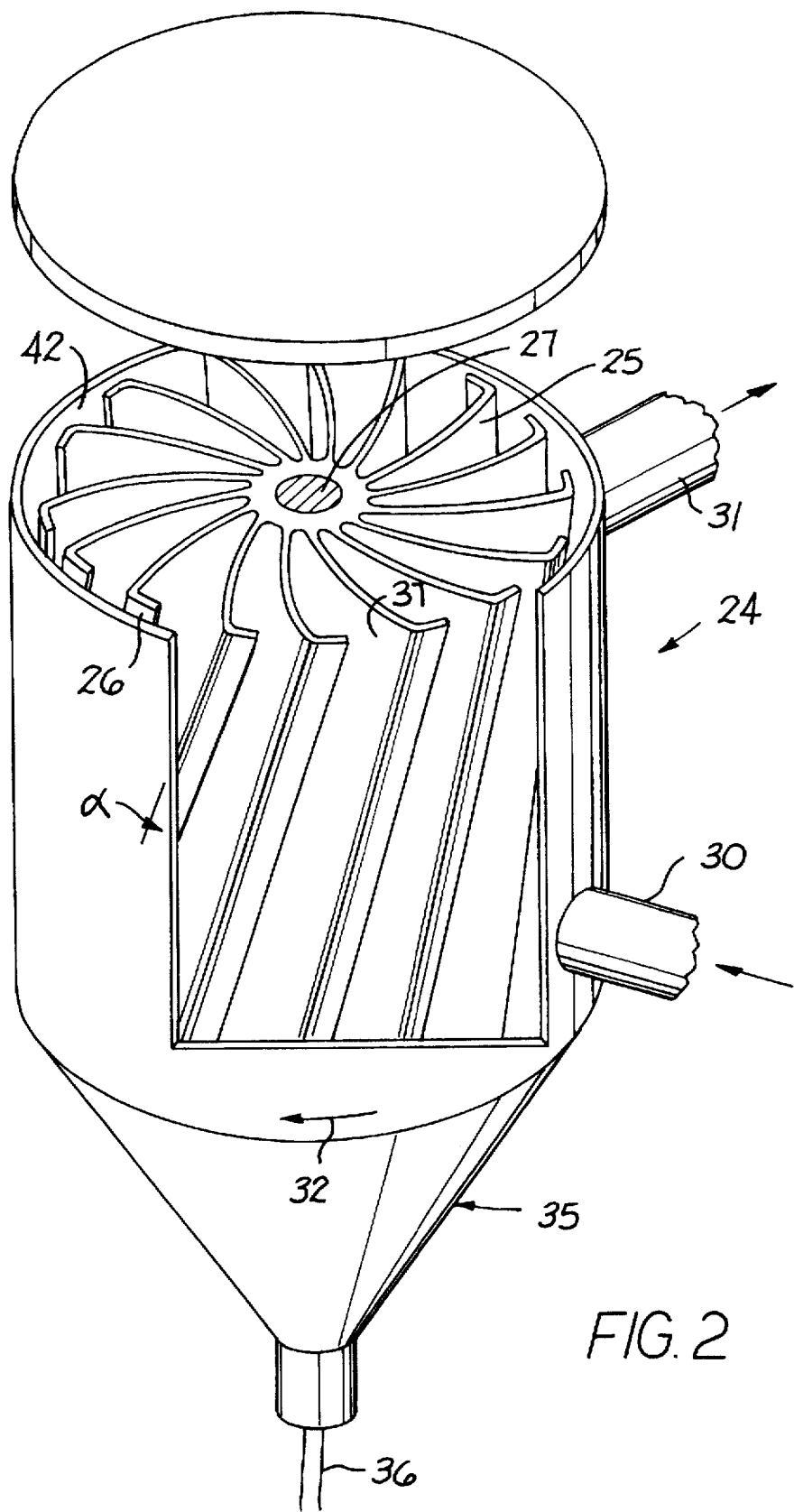
FIG. 2 is a partly cut away and exploded sketch of an improved rotary dynamic pressurized fuel filter embodiment afforded by this invention.

As seen from the sketch of FIG. 2, the dynamic filter 24 is a gas turbine like driven centrifugal separator with a set of rotor blades 25 having fins 26 curved in a direction opposite to rotation at their outer periphery. These rotor blades are arranged in a rotor cage comprising a cylindrical array encompassing novel blades, which are slanted downwardly in the direction of rotation at an acute angle (alpha) from the axis of rotor shaft 27. An input gas entry port 30 is disposed at a lower end of the cylindrical rotor cage with the output gas exit port 31 at the upper end and preferably spaced about 300 degrees around the circumference in the direction of rotation (32). This port configuration forces the gas flow stream upwardly in a spiral pattern as the rotor blades rotate, preferably at a speed of about 2000 RPM, to eventually exit. Since the contaminants are generally heavier than the natural gas, they are thus subjected to separation by the force of gravity from the gas flow stream over its elongated spiral path between the input port 30 and the exit port 31.

The fins or lips 26 of rotor blades 25 serve to assist in the turbine effect rotation of the rotor cage in response to the incoming high pressure gas stream. Furthermore these lips 26 tend to intercept the separated contaminants slung outwardly by centrifugal forces from the trailing faces of the rotor blades 25 in response to the high speed rotor cage rotation. Thus these contaminants are directed downwardly toward the underlying reservoir 35 within the housing 42 for discharge out the removal pipe 36. Similarly the generally radially extending leading slanted blade surfaces 37 will from the flow of the gas intercept the more sluggish, heavier contaminants in the spiralling gas flow stream and direct the contaminants downwardly.

With a rotor cage having about 30 blades and a diameter of about 24 inches, and a rotation speed of about 2000 RPM and a gas flow pressure of about 250 psi, this configuration was found to remove microscopic abrasive particles and liquid contaminants such that the life of a fluid pressure operated engine was extended from a few hours of operation previously obtained from raw natural gas at the wellhead to several months, after which a minimal showing of wear and deteriorization occurred. Thus, the wide range of engine threatening contaminants present in a raw gas stream that adversely affected the operation and life of the engine are effectively removed.

Figure 3:
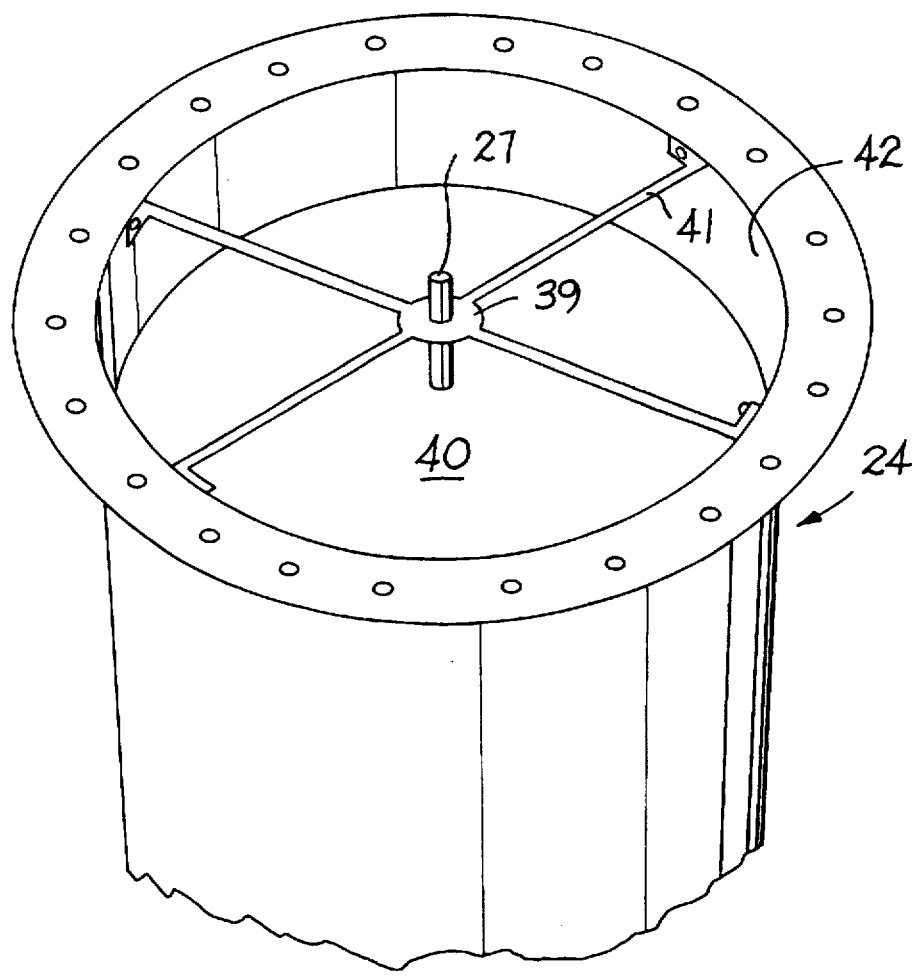
FIG. 3 is a fragmental sketch of a spider mount array for the filter rotor provided in accordance with this invention.

The rotor cage 40, turning about shaft 27 is shown in FIG. 3 to be firmly mounted in appropriate bearings 39 by the spider 41 inside the outer shell 42 to rotate without vibration during operation.

While it is not entirely clear how the dynamic forces interact with each other within the dynamic rotor separator hereinbefore described to remove individual contaminants, there are several forces imposed upon the gas flow stream transversing the separator, all working to remove heavier contaminants toward the reservoir 35 at the bottom of the separator 24. The natural gas being lighter in weight than the various contaminants, thus will flow upwardly from inlet port 30 to outlet port 31 in a spiral path over which the heavier particles tend to flow by the force of gravity downwardly toward the contaminant reservoir 35.

Also the centrifugal action of the rotor cage as it rotates at high speeds is significant in slinging the heavier particles outwardly from the rotor shaft 27 towards the flanged lips 26, some of which are intercepted by contact with the leading surfaces of the slanting blades 37, which therefore provide ramping forces downwardly for separation of the heavier contaminants.

The various engine life threatening contaminants of differing characteristics, such as liquid acids, salt water, water vapor, oils, various chemicals and abrasive particles are thus effectively removed by this single dynamic filter arrangement even though the physical and chemical behavior range of contaminants is extensive. Accordingly, there is provided by this invention, not only an improved long-life fluid pressure engine system operable directly from raw natural gas at a well head but also a dynamic filter system for raw natural gas at the well head that removes various contaminants to condition the natural gas for a wider range of utility.

Having therefore improved the state of the art, those novel features of the invention representative of the spirit and nature of the invention are defined with particularity in the following claims.

I claim:

1. In a natural gas driven fluid pressure engine system, the improvement comprising in combination: a source of raw natural gas under pressure at the wellhead, a fluid pressure engine, means for conveying the natural gas for fuel to the engine through a designated flow path, and a rotary dynamic turbine type centrifugal separator in the designated flow path for separating contaminants from the natural gas rotated by the flow of the gas, said separator being characterized by: a rotor shaft with a vertically disposed axis, a set of spaced generally vertically disposed rotor blades generally radially extending outwardly from the rotor shaft and disposed at an acute angle from the vertically disposed rotor axis in a generally cylindrical configuration, the blades thereby comprising ramp means for intercepting contaminants from the natural gas flow to direct them downwardly, a raw natural gas input port disposed at a lower cylindrical configuration location, and a decontaminated natural gas output port disposed at an upper cylindrical configuration location and spaced circumferentially about the cylindrical configuration in the direction of rotation to produce an upward spiral flow of the gas from the input port to the output port through the separator when the rotor is rotating.

2. The system of claim 1 further comprising a residue discharge system for automatically flushing accumulated separated contaminants from the separator.

3. The system of claim 1 further comprising a rotor assembly that rotates approximately 2000 RPM in response to a natural gas flow pressure of approximately 250 psi.

4. A dynamic rotary decontamination filter for processing a raw natural gas flow stream under pressure at a wellhead site to remove liquid and abrasive contaminants carried in the flow stream, comprising in combination: a rotor shaft with a vertically disposed axis, a set of spaced generally vertically disposed rotor blades generally radially extending outwardly from the rotor shaft; said blades being disposed at an acute angle from the vertically disposed rotor axis in a generally cylindrical rotor cage configuration thereby comprising ramp means for intercepting contaminants from the natural gas flow to direct them downwardly; a raw natural gas input port disposed at a lower cylindrical configuration location; and a decontaminated natural gas output port disposed at an upper cylindrical configuration location and spaced circumferentially about the cylindrical configuration in the direction of rotor travel to produce during rotation of the rotor cage an upward spiral flow of the gas from the input port to the output port through the separator.

5. The separator of claim 4 further comprising: rotor mount and blade construction responsive to natural gas under pressure of about 250 psi for rotation speeds of about 2000 RPM.

6. The separator of claim 4 further comprising: a liquid collection reservoir below the cylindrical configuration for accumulating contaminants separated from the natural gas flow stream, and an automatic discharge system for removing excess accumulated liquids from said reservoir.

\* \* \* \* \*